R. & T. Winans,
Locomotive Fire-Box.
No. 470. Reissued June 16, 1857.
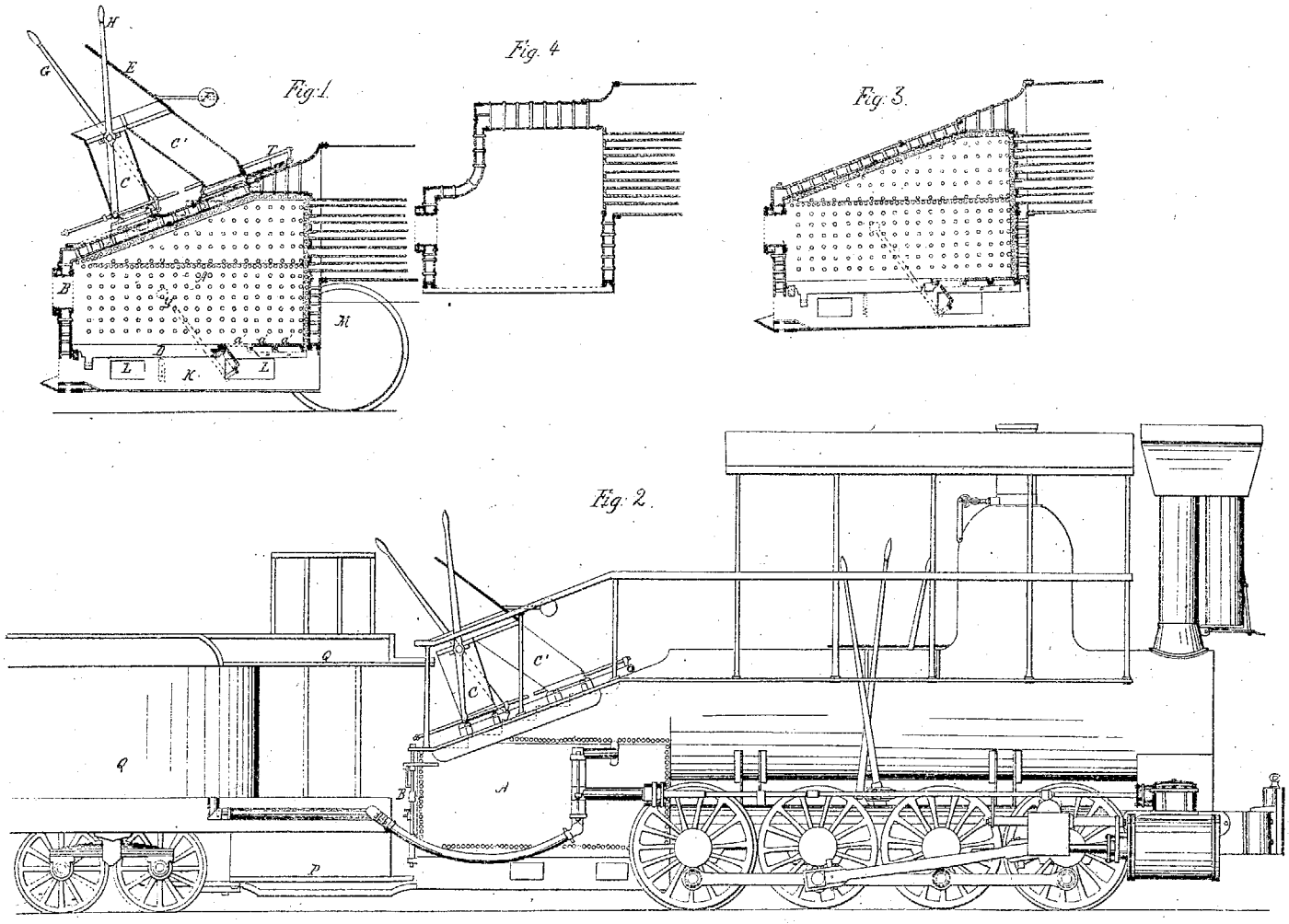

BEST AVAILABLE COPY

UNITED STATES PATENT OFFICE.

ROSS WINANS AND THOMAS WINANS, OF BALTIMORE, MARYLAND.

IMPROVEMENT IN LOCOMOTIVE FIRE-BOXES.

Specification forming part of Letters Patent No. 10,901, dated May 9, 1854; Reissue No. 470, dated June 16, 1857.

*To all whom it may concern:*

Be it known that we, ROSS WINANS and THOMAS WINANS, of the city of Baltimore, in the State of Maryland, have invented a new and useful Improvement in Locomotive-Engines, having particular reference to the burning of coal as fuel, of which the following is a full, clear, and exact description, reference being had to the drawings which are hereto annexed, in which—

Figure 1 represents a vertical longitudinal section of the fire-box of a locomotive adapted to the use of coal as fuel. Fig. 2 represents a side elevation of such a locomotive and the tender devised by us therefor; and Figs. 3 and 4 represent vertical longitudinal sections of the fire-boxes of locomotives constructed to be fired from a single fire-door, showing the size of our fire box compared with the largest manufactured by Ross Winans prior to our invention.

In devoting himself to the improvement of locomotive-engines for burning anthracite and bituminous coals, Ross Winans, one of the present claimants, found that one of the most essential requisites in such a locomotive was a large area of grate-surface, because coal burns much more slowly than wood, and a greater weight thereof must be maintained in ignition at a time, and because coal can only be burned with success and economy when spread over the grate-bars in a stratum of a few inches in thickness. In endeavoring to obtain this enlarged grate-surface many obstacles were encountered, resulting mainly from the position of the frame of the engine, the necessity of procuring an equal distribution of the weight of the engine upon its wheels, and the difficulty of inspecting and cleaning the fire box and grate while the engine is in motion. He however succeeded in overcoming these obstacles by inventions for which he has applied for Letters Patent of the United States, and by which he has been enabled to construct a locomotive fire-box and grate of larger dimensions than had been obtained without affecting the efficiency of the engine in other respects. In prosecuting his experiments to increase the dimensions of the grate he was met by the difficulty resulting from imposing an undue weight upon the hinder wheels by increasing still further the length of the grate and of the fire-box in which the grate is contained. This difficulty placed a limit to the size of grate which could be obtained with advantage by Ross Winans by means of his improvements; but as it is desirable to obtain in a locomotive a grate of still larger dimensions, and as an equable disposition of the weight upon the wheels of a locomotive is a matter of great practical importance, we turned our attention to the subject, and we have devised a new arrangement and combination of the parts of a locomotive fire-box and grate by means of which a grate of increased size can be obtained without affecting injuriously the equable disposition of the weight upon the wheels, while at the same time the necessary facilities are afforded for supplying fuel to the grate from the tender.

In order that coal may be burned with facility, it should be distributed in a stratum of but a few inches in thickness upon the grate-bars, where it should rest as undisturbed as possible so long as it continues to burn freely; hence it is advantageous to employ a grate which is flat, or thereabout, because if the grate be inclined the agitation imparted by the movement of the locomotive tends to cause the coal to slide down the inclined surface of the bars and accumulate at the lower ends thereof. It is also necessary that the fire-door or feeding-hole should be placed at the rear of the fire box in a convenient position to supply fuel from the tender to the grate. As the coal is burned with advantage in a stratum of but a few inches in thickness, it would appear possible to diminish the weight of the fire-box by depressing the roof uniformly or throughout its whole extent, and thus permit the sides of the fire-box to be made of much less height, and consequently of less weight. It is, however, equally necessary that the space above the fuel should be sufficient to permit the inflammable gases to burn in the fire-box before they enter the flues. It is also necessary that the part of the fire-box which adjoins the flues should be of sufficient size to distribute the flame uniformly thereto, and hence a uniform depression of the roof of the fire-box, and the consequent diminution in the weight and dimensions of the sides, cannot be made without affecting the efficiency of the engine in other respects.

The object of our invention is to obtain a large fire-box of the least weight without sacrificing the points which we have enumerated as necessary to the efficiency of the engine; and our invention consists in constructing the roof of the fire-box with a downward and rearward inclination, in combination with a grate flat, or thereabout, and with a door or feeding-hole, as usual, at the rear. We thus retain the advantages resulting from a flat grate and a rear door by which it may be supplied with fuel from the tender, while the inclined roof of the fire-box is sufficiently high at its front end to afford space beneath it for the burning of the inflammable gases and for their free distribution to the flues, and its downward and rearward inclination permits the sides of the rear end of the fire-box to be made of less height, and consequently of less weight, than they would otherwise be.

By means of our invention we are enabled to obtain a fire-box and grate of enlarged size, and in order to supply fuel to the forward end of such a grate we find it advisable to use in connection with our invention, as above set forth, feed holes or doors in the roof of the fire box, which may be fitted with feed-boxes, and by which the fuel may be conveniently supplied to a grate of such length.

The locomotive represented in the accompanying drawings exemplifies our invention. The fire-box A of this locomotive is of great length. It is furnished with a grate, D, whose surface is flat throughout its whole extent, and the rear end of the fire-box has a door at end hole, B, through which fuel may be supplied from the tender. The roof of the fire-box is sufficiently high at its front end to permit the flame to rise and enter the uppermost flues with freedom; thence it inclines downward, until at the hinder end of the fire-box it is high enough above the grate to afford sufficient room for securing the door-frame. The room of the fire-box is perforated to form two feeding-holes, and these are surmounted by feeding-boxes C and C′, whose upper and lower ends are fitted with doors. When these feeding-boxes are employed, they should be used in connection with our double-platform tender, which we have represented in the drawings hereto annexed.

We do not limit ourselves to any particular length of fire-box, for this must be comparative, and be regulated by the class of the engine, nor to the right lines and rectangles shown in the drawings, for the top of the fire-box may be rounded crosswise of the road or made polygonal, and the slope lengthwise may be curved instead of straight, as we have drawn it.

What we claim in the construction of locomotive fire-boxes is—

The downward and rearward inclination of the top or roof, in combination with the flat grate-surface and the usual feeding hole or door, and with or without the fuel-feeding boxes through the roof, as herein described.

ROSS WINANS.
THOMAS WINANS.

In presence of—
L. JEWETT GROVE,
JAMES BUSEY.